United States Patent
Jitkoff et al.

(10) Patent No.: US 8,539,373 B1
(45) Date of Patent: Sep. 17, 2013

(54) SLIDING WINDOW MANAGER

(75) Inventors: John Nicholas Jitkoff, Palo Alto, CA (US); Daniel T. Erat, San Francisco, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/247,848

(22) Filed: Sep. 28, 2011

Related U.S. Application Data (60) Provisional application No. 61/504,683, filed on Jul. 5, 2011.

(51) Int. Cl.
*G06F 3/048* (2013.01)

(52) U.S. Cl.
USPC ............................ 715/796; 715/790; 715/795

(58) Field of Classification Search
USPC .................................. 715/790, 795, 796, 797
See application file for complete search history.

(56) References Cited

U.S. PATENT DOCUMENTS

| | | | |
|---|---|---|---|
| 5,949,418 A * | 9/1999 | Shields et al. ................. | 715/795 |
| 6,239,798 B1 * | 5/2001 | Ludolph et al. ................ | 715/788 |
| 6,342,908 B1 * | 1/2002 | Bates et al. .................... | 715/798 |
| 6,526,397 B2 * | 2/2003 | Chee et al. ............................. | 1/1 |
| 6,907,447 B1 * | 6/2005 | Cooperman et al. .......... | 709/203 |
| 6,957,395 B1 * | 10/2005 | Jobs et al. ...................... | 715/765 |
| 7,385,875 B2 * | 6/2008 | May et al. ......................... | 368/10 |
| 7,478,326 B2 * | 1/2009 | Holecek et al. ............... | 715/716 |
| 7,681,143 B2 * | 3/2010 | Lindsay et al. ................ | 715/788 |
| 7,739,604 B1 * | 6/2010 | Lyons et al. ................... | 715/736 |
| 7,823,080 B2 * | 10/2010 | Miyajima et al. ............. | 715/792 |
| 7,941,758 B2 * | 5/2011 | Tremblay ....................... | 715/765 |
| 2002/0044161 A1 * | 4/2002 | Sugai ............................. | 345/781 |
| 2003/0117440 A1 * | 6/2003 | Hellyar et al. ................. | 345/767 |
| 2005/0114792 A1 * | 5/2005 | Gest ............................... | 715/804 |
| 2007/0288863 A1 * | 12/2007 | Ording et al. ................. | 715/788 |
| 2008/0163104 A1 * | 7/2008 | Haug .............................. | 715/788 |
| 2009/0119606 A1 * | 5/2009 | Gilbert .......................... | 715/758 |
| 2010/0088634 A1 * | 4/2010 | Tsuruta et al. ................. | 715/800 |

OTHER PUBLICATIONS

Russinovich, Mark, and Bryce Cogswell, Jan. 19, 2010, "Desktops V1.02", Desktops, pp. 1-2, Retrieved Dec. 27, 2011, http://technet.microsoft.com/en-us/sysinternals/cc817881.

Wikipedia, The Free Encyclopedia, Feb. 22, 2009, "Spaces (software)", pp. 1-3, Retrieved Dec. 27, 2011, http://en.wikipedia.org/wiki/Spaces_(software).

Gechlik, Karl L., Aug. 29, 2008, "Power Toy—Microsoft's Virtual Desktop Manager",pp. 1-11, Retrieved Dec. 27, 2011, http://www.makeuseof.com/tag/power-toy-microsofts-virtual-desktop-manager.

* cited by examiner

*Primary Examiner* — Phenuel Salomon
(74) *Attorney, Agent, or Firm* — McDermott Will & Emery LLP (57) ABSTRACT

The subject matter of this specification can be implemented in, among other things, a method that includes presenting a first window in a graphical user interface. The method includes presenting at least a portion of each secondary window. The method includes presenting one or more indicators indicating that additional windows exist. The method includes receiving a first user selection of a first one of the indicators. The method includes bringing at least one of the additional windows to the foreground, moving the at least one of the additional windows across the graphical user interface to be in view of the graphical user interface, sending the first window and the secondary windows behind the at least one of the additional windows, and moving at least one of the first window and the secondary windows across the graphical user interface to be out of view of the graphical user interface.

24 Claims, 9 Drawing Sheets

SLIDING WINDOW MANAGER

CROSS-REFERENCE TO RELATED APPLICATIONS

This application claims the benefit of U.S. Provisional Application No. 61/504,683, filed on Jul. 5, 2011, and entitled "Sliding Window Manager," which is incorporated herein by reference.

TECHNICAL FIELD

This instant specification relates to window management in a graphical user interface.

BACKGROUND

Window-based graphical user interfaces generally include a window manager that controls the placement and appearance of interface windows for applications within a windowing system. In some cases, the window manager allows interface windows to be opened, closed, minimized, maximized, moved, and resized. In addition, the window manager often provides interface window decorators, such as a title bar or tab and/or a toolbar.

SUMMARY

In one aspect, a computer-implemented method for sliding based window management includes presenting a first window in a foreground of a graphical user interface. The method further includes presenting at least a portion of each of one or more secondary windows in the graphical user interface. The method further includes presenting one or more indicators in the graphical user interface indicating that additional windows exist. The method further includes receiving a first user selection of a first one of the indicators. The method further includes, in response to receiving the first user selection, bringing at least one of the additional windows to the foreground in the graphical user interface, moving the at least one of the additional windows across the graphical user interface to be in view of the graphical user interface, sending the first window and the secondary windows behind the at least one of the additional windows, and moving at least one of the first window and the secondary windows across the graphical user interface to be out of view of the graphical user interface.

Implementations can include any, all, or none of the following features. The method can include receiving a second user selection of one of the secondary windows and, in response to receiving the second user selection, bringing the selected one of the secondary windows to the foreground in the graphical user interface and sending the first window and others of the secondary windows behind the selected one of the secondary windows without moving the first window and the secondary windows across the graphical user interface. Each of the indicators can include a grayed or blurred portion of an associated one of the additional windows. The first window and the at least one of the additional windows can occupy less than a full width of the graphical user interface. Moving the additional window across the graphical user interface can include moving the additional window horizontally across the graphical user interface. Moving the at least one of the first window and the secondary windows across the graphical user interface can include moving the at least one of the first window and the secondary windows horizontally across the graphical user interface. The first window, the secondary windows, and the additional windows can be included in an ordered list of windows. Prior to receiving the first user selection, the first one of the indicators can indicate that one or more of the additional windows exist before the first window and the secondary windows in the ordered list of windows. A second one of the indicators can indicate that one or more of the additional windows exist after the first window and the secondary windows in the ordered list of windows. The method can include determining, in response to the first user selection, that none of the additional windows exist before the at least one of the additional windows in the ordered list of windows, and no longer presenting the first one of the indicators in response to determining that none of the additional windows exist before the at least one of the additional windows. Moving the at least one of the first window and the secondary windows across the graphical user interface can include moving a last one of the secondary windows across the graphical user interface to be out of view of the graphical user interface. The method can further include moving the first window and ones of the secondary windows other than the last one of the secondary windows across the graphical user interface with at least a portion of each remaining in view of the graphical user interface.

In one aspect, a computer-readable medium storing instructions that when executed cause a computer to perform operations for sliding based window management, where the operations include presenting a first window in a graphical user interface. The first window is active. The operations further include presenting at least a portion of each of one or more secondary windows in the graphical user interface. The secondary windows are not active. The operations further include presenting one or more indicators in the graphical user interface indicating that additional windows exist. The operations further include receiving a first user selection of a first one of the indicators. The operations further include, in response to receiving the first user selection, making at least one of the additional windows active in the graphical user interface, moving the at least one of the additional windows across the graphical user interface to be in view of the graphical user interface, making the first window and the secondary windows not active, and moving at least one of the first window and the secondary windows across the graphical user interface to be out of view of the graphical user interface.

Implementations can include any, all, or none of the following features. The operations can further include receiving a second user selection of one of the secondary windows and, in response to receiving the second user selection, making the selected one of the secondary windows active in the graphical user interface and making the first window and others of the secondary windows not active without moving the first window and the secondary windows across the graphical user interface. Each of the indicators can include a grayed or blurred portion of an associated one of the additional windows. The first window and the at least one of the additional windows can occupy less than a full width of the graphical user interface. Moving the additional window across the graphical user interface can include moving the additional window horizontally across the graphical user interface. Moving the at least one of the first window and the secondary windows across the graphical user interface can include moving the at least one of the first window and the secondary windows horizontally across the graphical user interface. The first window, the secondary windows, and the additional windows can be included in an ordered list of windows. Prior to receiving the first user selection, the first one of the indicators can indicate that one or more of the additional windows exist before the first window and the secondary windows in the ordered list of windows. A second one of the indicators can indicate that one or more of the additional windows exist after the first window and the secondary windows in the ordered list of windows. The operations can further include determining, in response to the first user selection, that none of the additional windows exist before the at least one of the additional windows in the ordered list of windows, and no longer presenting the first one of the indicators in response to determining that none of the additional windows exist before the at least one of the additional windows. Moving the at least one of the first window and the secondary windows across the graphical user interface can include moving a last one of the secondary windows across the graphical user interface to be out of view of the graphical user interface. The operations can further include moving the first window and ones of the secondary windows other than the last one of the secondary windows across the graphical user interface with at least a portion of each remaining in view of the graphical user interface.

In one aspect, a computer-implemented system for sliding based window management includes a display device that presents a graphical user interface that includes a first window, at least a portion of a second window, and one or more overflow indicators. The first window is active and the second window is not active. The overflow indicators indicate that additional windows exist that are not currently presented. The system further includes an interface that receives a first user input that selects a first one of the overflow indicators. The system further includes one or more processors that, in response to receiving the first user input, make at least one of the additional windows active in the graphical user interface, move the at least one of the additional windows across the graphical user interface to be in view of the graphical user interface, make the first window and the second window not active, move the first window across the graphical user interface with at least a portion of the first window remaining in view of the graphical user interface, and move the second window across the graphical user interface to be out of view of the graphical user interface.

Implementations can include any, all, or none of the following features. The interface can receive a second user input that selects the second window, and the processors, in response to receiving the second user input, can make the second window active in the graphical user interface, and make the first window not active without moving the first window and the second window across the graphical user interface. Each of the overflow indicators can include a grayed or blurred portion of an associated one of the additional windows. The first window and the at least one of the additional windows can occupy less than a full width of the graphical user interface. The processors can move the at least one of the additional windows, the first window, and the second window horizontally across the graphical user interface. The first window, the second window, and the additional windows can be included in an ordered list of windows. Prior to receiving the first user input, the first one of the overflow indicators can indicate that one or more of the additional windows exist before the first window and the second window in the ordered list of windows. A second one of the overflow indicators can indicate that one or more of the additional windows exist after the first window and the second window in the ordered list of windows. The processors can determine, in response to the first user input, that none of the additional windows exist before the at least one of the additional windows in the ordered list of windows, and no longer present the first one of the overflow indicators on the display device in response to determining that none of the additional windows exist before the at least one of the additional windows.

The details of one or more implementations are set forth in the accompanying drawings and the description below. Other features and advantages will be apparent from the description and drawings, and from the claims.

DETAILED DESCRIPTION

This document describes systems and techniques for managing windows in a graphical user interface using a sliding based metaphor. Conceptually, a window manager moves or navigates through a set of windows so that the windows appear to slide from side to side. In addition, the window manager can also use a stacking metaphor, so that moving through the set of windows appears to move up or down through the stack of windows. A particular number of windows are directly accessible on the currently viewed display screen (e.g., by staggering the display of portions of the stack of windows), and one or more other windows are accessible after sliding or shifting the stack of windows to the side to access one or more of the previously inaccessible windows.

The systems and techniques described here may provide one or more of the following advantages. First, a system can provide a reduction in processing at a central processing unit or graphics processing unit by restricting the directly accessible windows to a particular number of windows. Second, a system can provide quick navigation among a large number of windows.

Figure 1:
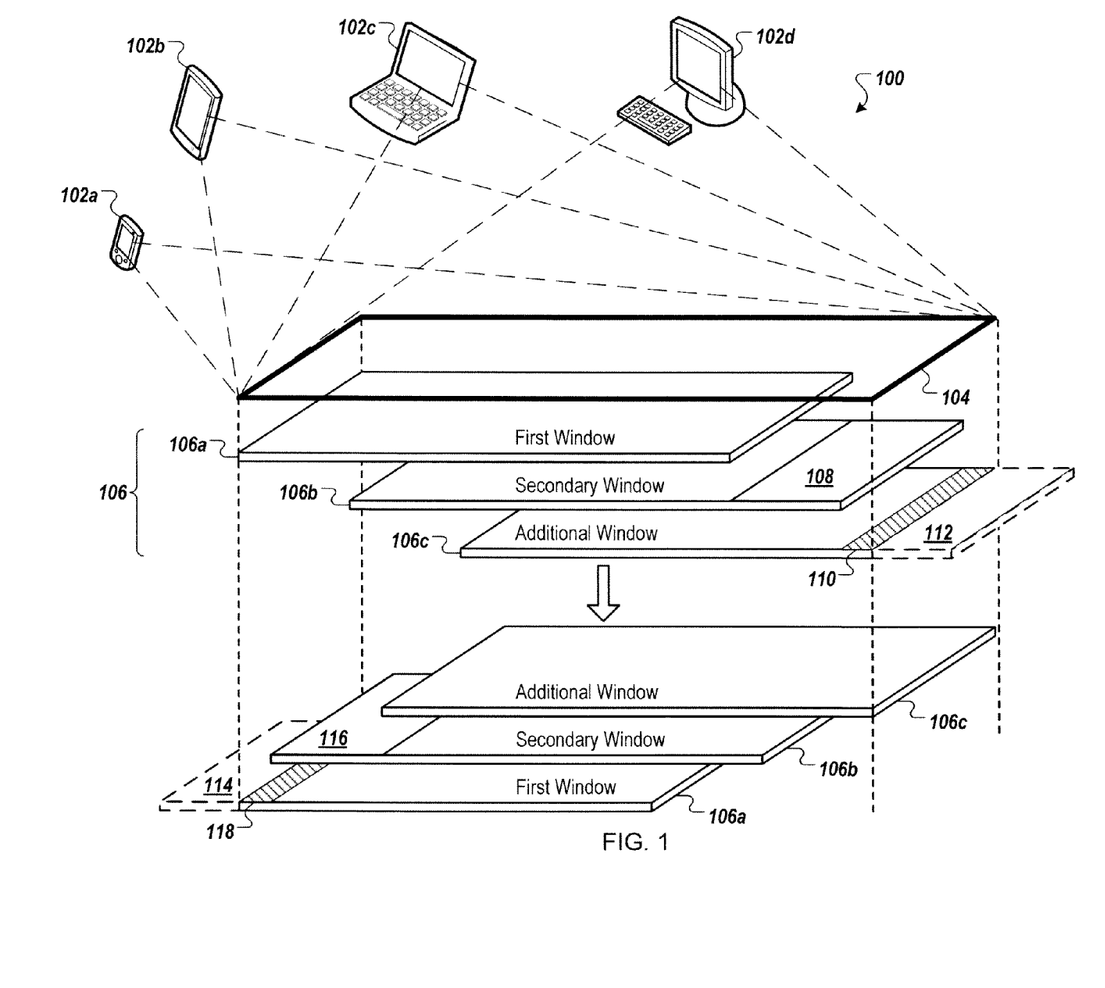
FIG. 1 is a schematic diagram that shows an example of a system for sliding based window management.

FIG. 1 is a schematic diagram that shows an example of a system 100 for sliding based window management. Sliding window management can be implemented in one or more types of computing devices, such as a smartphone 102a, a tablet computing device 102b, a laptop or netbook computing device 102c, and a desktop computing device 102d. Each display screen of the computing devices has a viewing area 104. The viewing area 104 presents a graphical user interface that can include multiple windows 106.

Each computing device includes a window manager, which is an application or application program interface (API) that manages the placement of the windows 106 within the viewing area 104. For example, the window manager can determine which of the windows 106 are to be displayed at a particular point in time and which of the windows 106 are hidden or out the viewing area 104. The window manager can also move a window from outside the viewing area 104 into the viewing area 104 using a sliding based navigation.

The windows 106 are shown in FIG. 1 conceptually as whole windows in separate layers for ease of description. However, the actual representation of the windows on a display device may use another metaphor or internal representation. For example, the window manager can present a first window 106a in a top or foreground layer. The first window 106a is the active window or the window that a user is currently accessing. In some implementations, the first window 106a is completely visible within the viewing area 104 of the display device. In some implementations, the first window 106a occupies the full height of the viewing area 104 and less than the full width of the viewing area 104.

The window manager also presents a portion 108 of at least one secondary window 106b at a lower layer than (e.g., behind) the first window 106a. For example, the window manager can use a portion of the remainder of the width of the viewing area 104, after allotting horizontal viewing space to the first window 106a, for the secondary window 106b. In some implementations, the window manager staggers a stack of two or more windows so that the window manager displays at least one entire window and at least a portion of each of the other windows in the staggered stack. In some implementations, the portion 108 of the secondary window 106b also occupies the full height of the viewing area 104. A user can select the portion 108 to request that the window manager bring the secondary window 106b to the foreground and send the first window 106a to a layer behind the secondary window 106b.

The window manager also presents at least one indicator 110 on the display device when at least one additional window 106c exists that is currently outside or not displayed within the viewing area 104. The indicator 110 is a visual cue that the additional window 106c exists and at least a portion of which is currently outside or not displayed within the viewing area 104. In some implementations, the window manager includes a small grayed and/or blurred out portion of the additional window 106c in the indicator 110. A user can select the indicator 110 to request that the window manager bring the additional window 106c to the foreground and slide the additional window 106c into the viewing area 104. As a result, the sliding of the additional window 106c brings a portion 112 of the additional window 106c that was previously outside the viewing area 104 into the viewing area 104.

Accordingly, the window manager also slides one or more of the windows currently in the viewing area 104 out of the viewing area 104, such as the first window 106a. For example, the window manager can slide a portion 114 of the first window 106a outside the viewing area by the same amount that the additional window 106c was previously outside the viewing area 104. In addition, the window manager can also slide one or more of the windows currently in the viewing area 104 to the side of the viewing area 104, such as the secondary window 106b. For example, the window manager can slide the secondary window 106b to the side of the viewing area 104 so that a portion 116 of the secondary window 106b is visible from behind the additional window 106c within the viewing area 104.

In some implementations, the window manager presents a small grayed out and/or blurred portion of the first window 106a in an indicator 118. A user can select the indicator 118 to request that the window manager bring the first window 106a to the foreground and slide the first window 106a back into the viewing area 104 again.

Figure 2A:
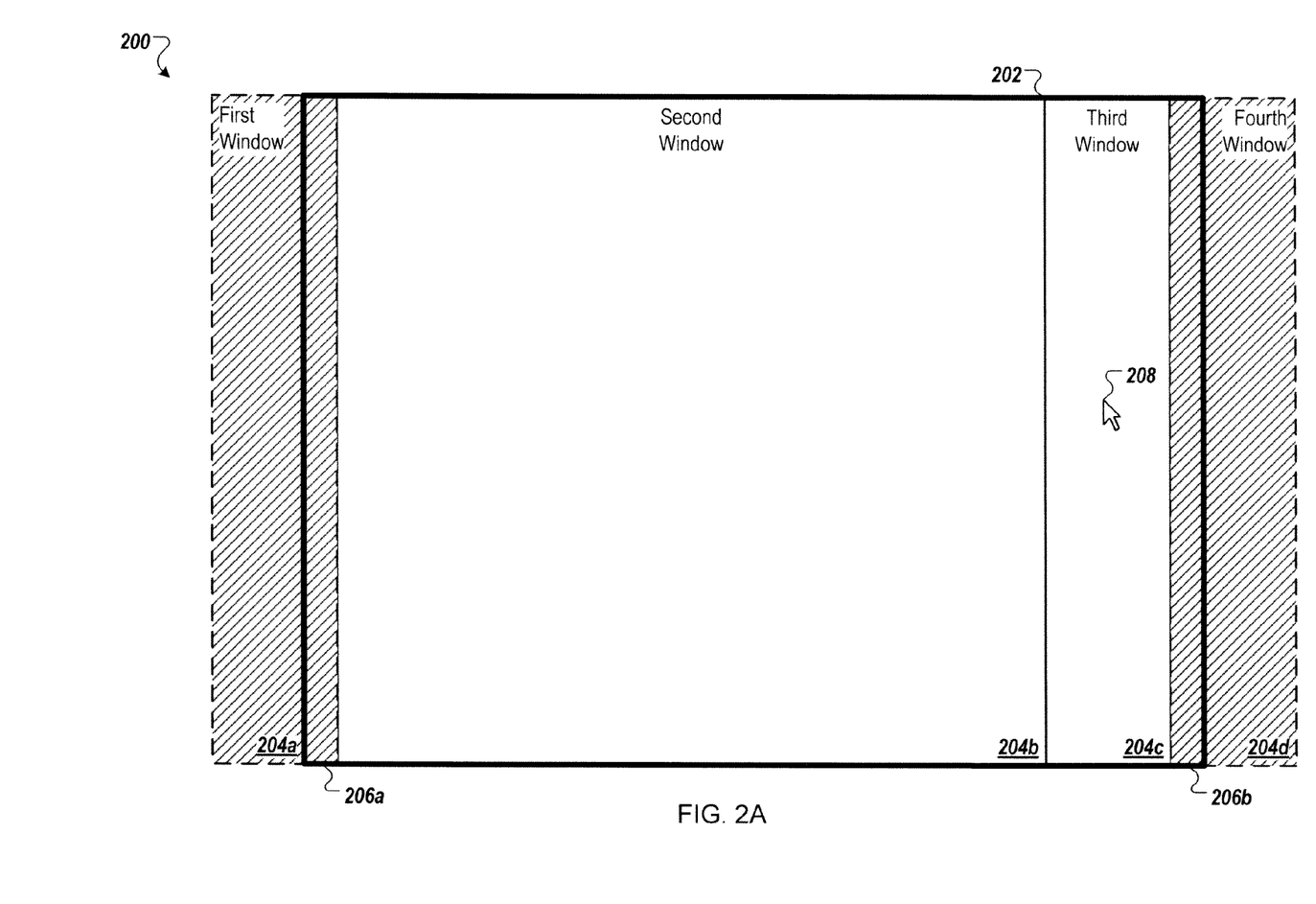
FIGS. 2A-F show examples of graphical user interfaces for sliding based window management.

FIG. 2A shows an example of a graphical user interface (GUI) 200 for sliding based window management. The GUI 200 includes a viewing area 202 (indicated by the bold line in FIG. 2A) that is presented on a display device of a computing device. A window manager that presents windows within the viewing area 202 currently manages a first window 204a, a second window 204b, a third window 204c, and a fourth window 204d. The second window 204b is currently active and displayed in the foreground within the viewing area 202. The window manager presents the third window 204c at a lower layer than the second window 204b. Accordingly, the window manager presents only a portion of the third window 204c in the viewing area 202.

The first window 204a and the fourth window 204d are not currently presented in the viewing area 202. In some implementations, the window manager is configured to present a particular number of windows within the viewing area 202, such as two (as shown in FIG. 2A) or another number of windows. The window manager presents one or more indicators 206a-b within the viewing area 202. The indicators 206a-b indicate to the user that one or more windows are currently not being presented within the viewing area 202. In particular, the indicator 206a indicates that one or more windows exist, that are not currently displayed, to the left of or above the second window 204b in a conceptual stack of windows. The indicator 206b indicates that one or more windows exist, that are not currently displayed, to the right of or below the third window 204c in the conceptual stack of windows.

In some implementations, the indicators 206a-b can include a representation of the contents of the first window 204a and the fourth window 204d, respectively. For example, the window manager can show a grayed and/or blurred out portion of the first window 204a and the fourth window 204d in the indicators 206a-b, respectively.

A user can make a request to the window manager to switch to a displayed window, such as the third window 204c, by selecting the displayed window. For example, the user can select a window portion using a pointing device 208, such as is provided by a mouse, trackball, touchpad, or touch screen. In another example, the user can select a window portion using keyboard inputs, such as arrow keys.

Figure 2B:
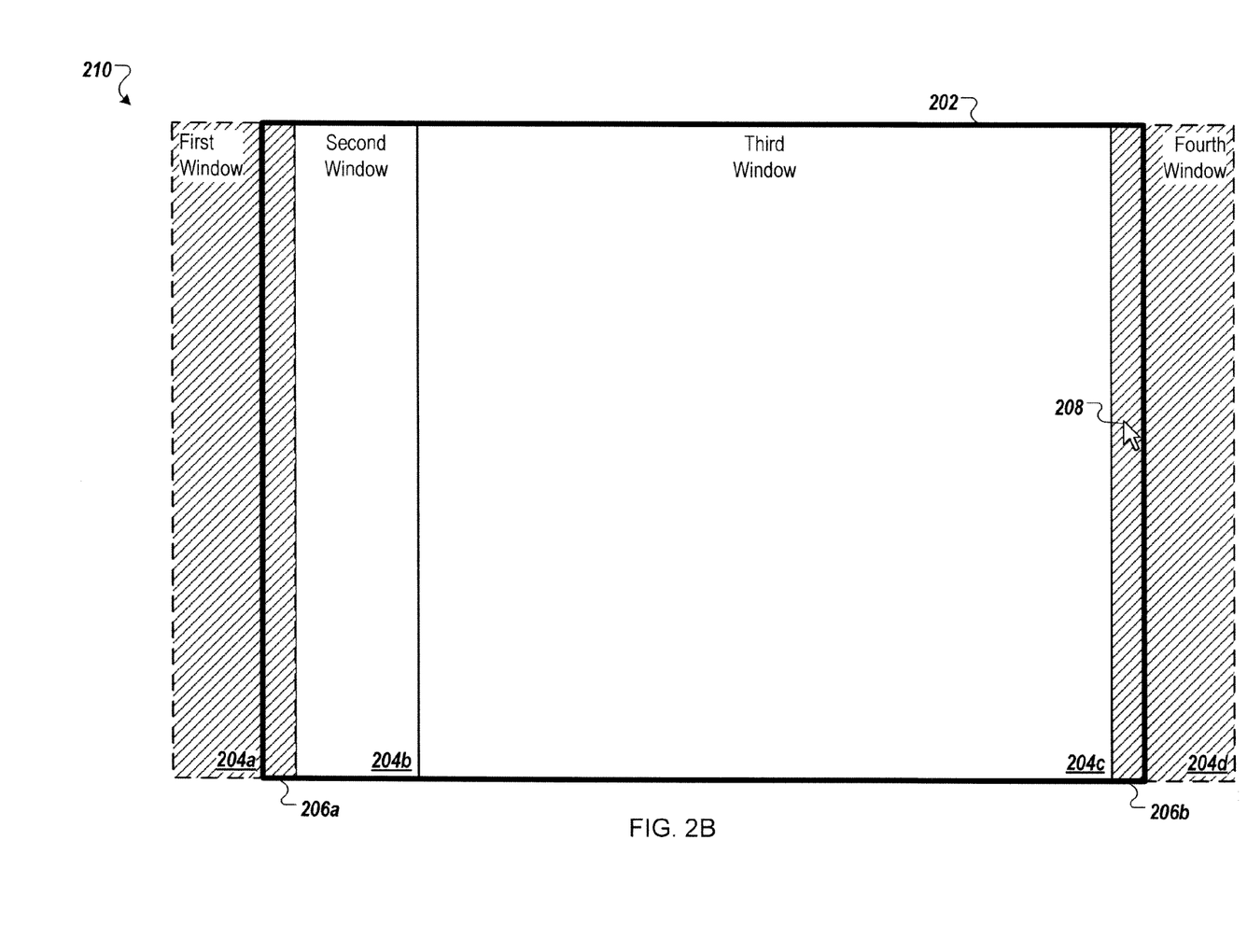

FIG. 2B shows an example of a GUI 210 after switching to another window that was previously displayed. In response to the user selection of the third window 204c, the window manager brings the third window 204c to the foreground. In addition, the window manager moves the second window 204b behind the third window 204c and as a result, only a portion of the second window 204b is currently displayed in the viewing area 202. The first window 204a and the fourth window 204d remain out of the viewing area 202 as indicated by the indicators 206a-b. A user can select one of the indicators 206a-b, such as the indicator 206b on the right side of the viewing area 202, to make a request to window manager to bring one or more other windows into the viewing area 202.

Figure 2C:
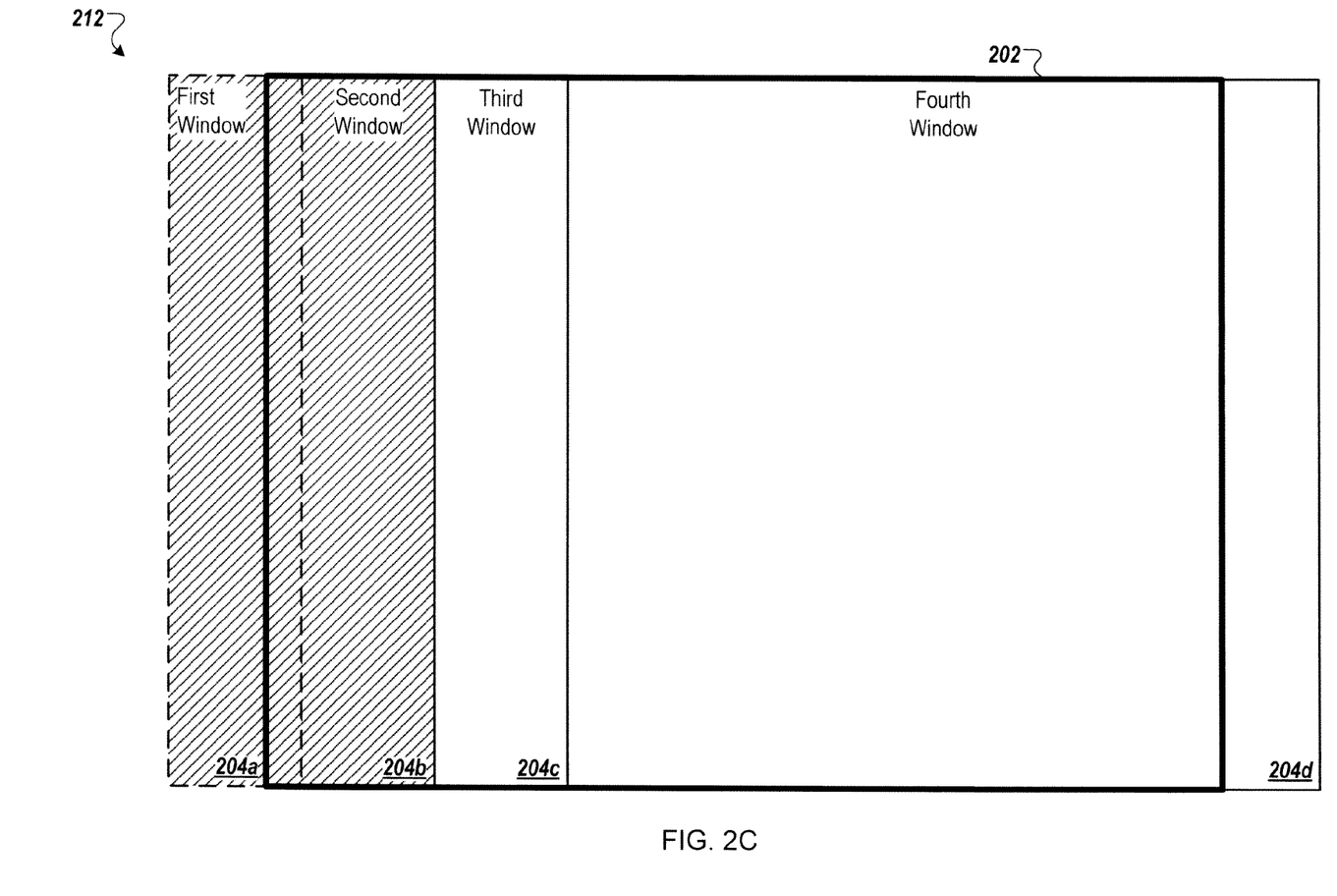

FIG. 2C shows an example of a GUI 212 after switching to another window that was previously outside the viewing area 202. In response to the user selection of the indicator 206b, the window manager brings the fourth window 204d to the foreground. In addition, the window manager places the third window 204c and the second window 204b behind the fourth window 204d. As a result, the window manager only presents a portion of each of the third window 204c and the second window 204b.

In some implementations, the window manager maintains an initial ordering of the windows after bringing the fourth window 204d to the foreground. For example, the window manager places the second window 204b behind the third window 204c, which the window manager places behind the fourth window 204d. In some implementations, the window manager grays or blurs out the portion of the second window 204b indicating that the second window 204b will be moved outside the viewing area 202.

Figure 2D:
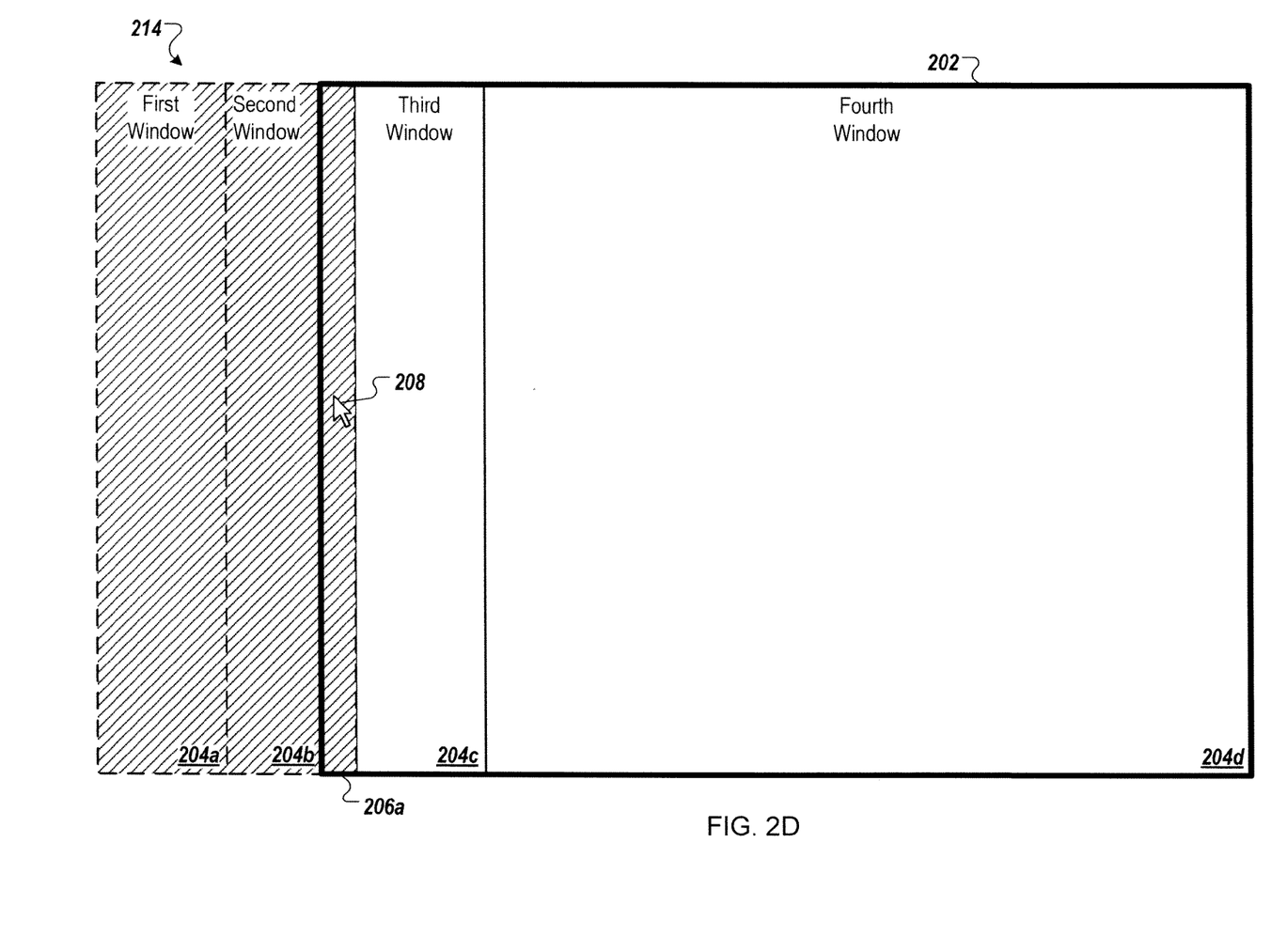

FIG. 2D shows an example of a GUI 214 after sliding a window into the viewing area that previously had a portion that was outside the viewing area 202. After bringing the fourth window 204d to the foreground, the window manager slides the fourth window 204d into the viewing area 202. The sliding motion can be animated so that the window manager can provide the user with a smooth visual transition from the original position of the fourth window 204d to the final position within the viewing area 202.

The window manger also slides the third window 204c to the left within the viewing area 202. The window manager gradually slides the second window 204b to the left until the second window 204b is no longer presented within the viewing area 202. The window manager no longer presents the indicator 206b, as there are no additional windows to the right of or above the fourth window 204d. In addition, the window manager continues to present the indicator 206a, which indicates that one or more windows exist, that are currently not displayed, to the left of or below the third window 204c.

In some implementations, the window manager can slide the indicator 206a off the viewing area 202 along with the second window 204b and present another indicator along the left edge of the viewing area 202. For example, the indicator 206a may include a grayed and/or blurred out portion of the first window 204a that the window manager slides to the left out of the viewing area 202 as the window manager slides the portion of the second window 204b into the space previously occupied by the indicator 206a. The window manager can then use a portion of the second window 204b that remains within the viewing area 202 as the new indicator. The user can select the indicator 206a to make a request to the window manager to display the next window to the left of or above the third window 204c in the stack of windows.

Figure 2E:
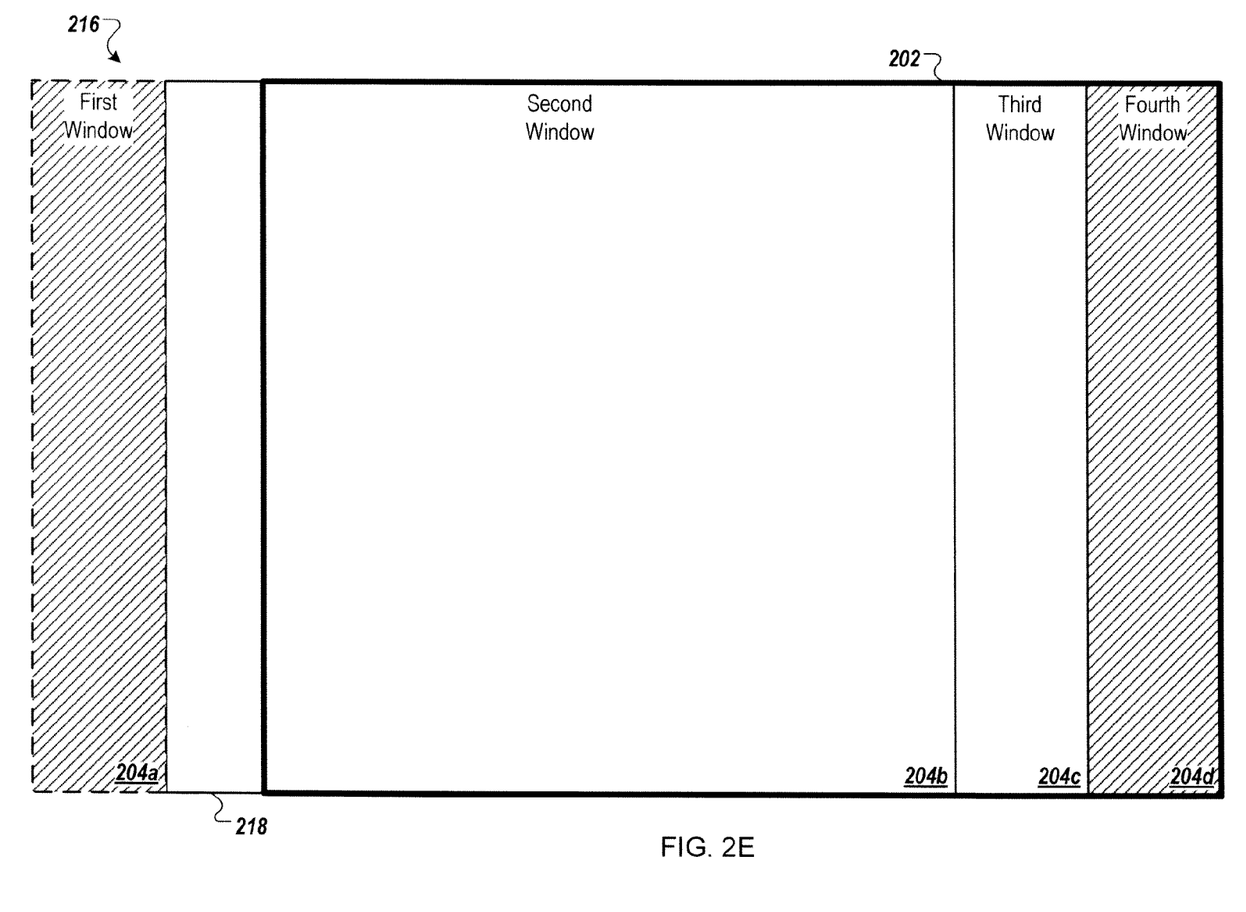

FIG. 2E shows an example of a GUI 216 after switching to another window that was previously outside the viewing area 202. In response to the user selection of the indicator 206a, the window manager brings the next window in the stack to the foreground (e.g., the second window 204b). Accordingly, the window manager sends the third window 204c and the fourth window 204d behind the second window 204b. While the second window 204b is currently the foreground window, a portion 218 of the second window 204b remains outside the viewing area 202.

Figure 2F:
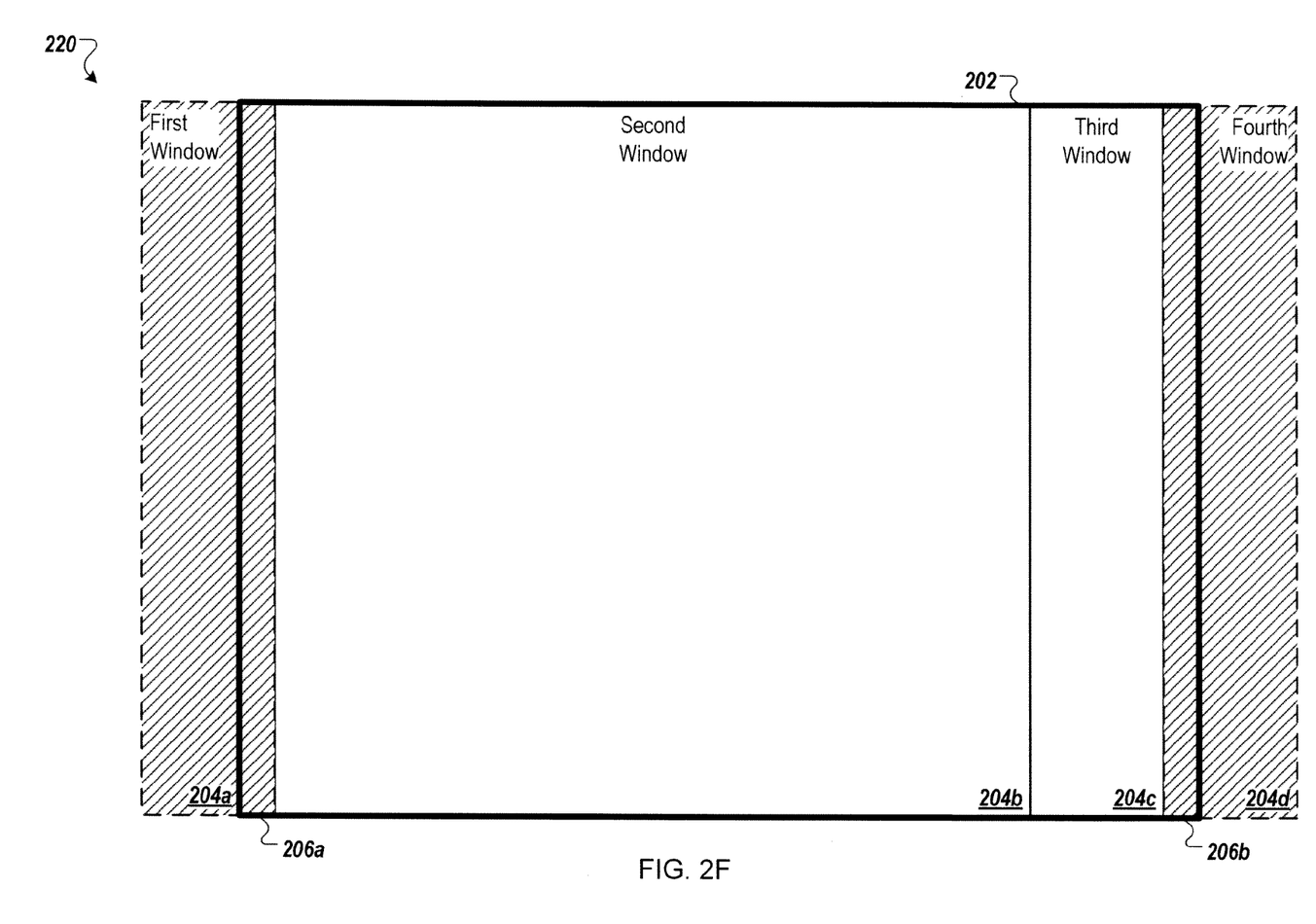

FIG. 2F shows an example of a GUI 220 after sliding a window into the viewing area that previously had a portion that was outside the viewing area 202. In particular, the window manager slides the second window 204b into the viewing area 202. In addition, the window manager slides the third window 204c to the right and slides the fourth window 204d out of the viewing area 202. The window manager also recreates the indicators 206a-b for the first window 204a and the fourth window 204d, respectively.

As previously described, while these examples show two windows as being currently displayed within the viewing area 202, another number of windows can be displayed within the viewing area 202. For example, in the case of three or more windows, the window manager presents a full window and at least a portion of each of two or more other windows. In this example, the window manager can place one or more portions to the left of the foreground window and one or more portions to the right of the foreground window. In some implementations, each of the three or more windows occupies the full height of the viewing area 202.

In some implementations, the window manager minimizes disruption to the user by maintaining the positions of the currently displayed windows within the viewing area 202. For example, as a user selects a portion of a displayed window that is not currently the foreground window, the window manager brings the selected window to the foreground without changing the horizontal position of the selected window or the horizontal position of the other displayed windows.

However, in response to selecting one of the indicators 206a-b, the window manager does change the horizontal position of the windows while bringing at least one other window into the viewing area 202. In some implementations, the window manager brings multiple other windows into the viewing area 202 in response to a user selection of one of the indicators 206a-b. For example, the window manager can shift the windows left or right by a particular number of windows, such as two or three, in response to a user selection of one of the indicators 206a-b.

Figure 3:
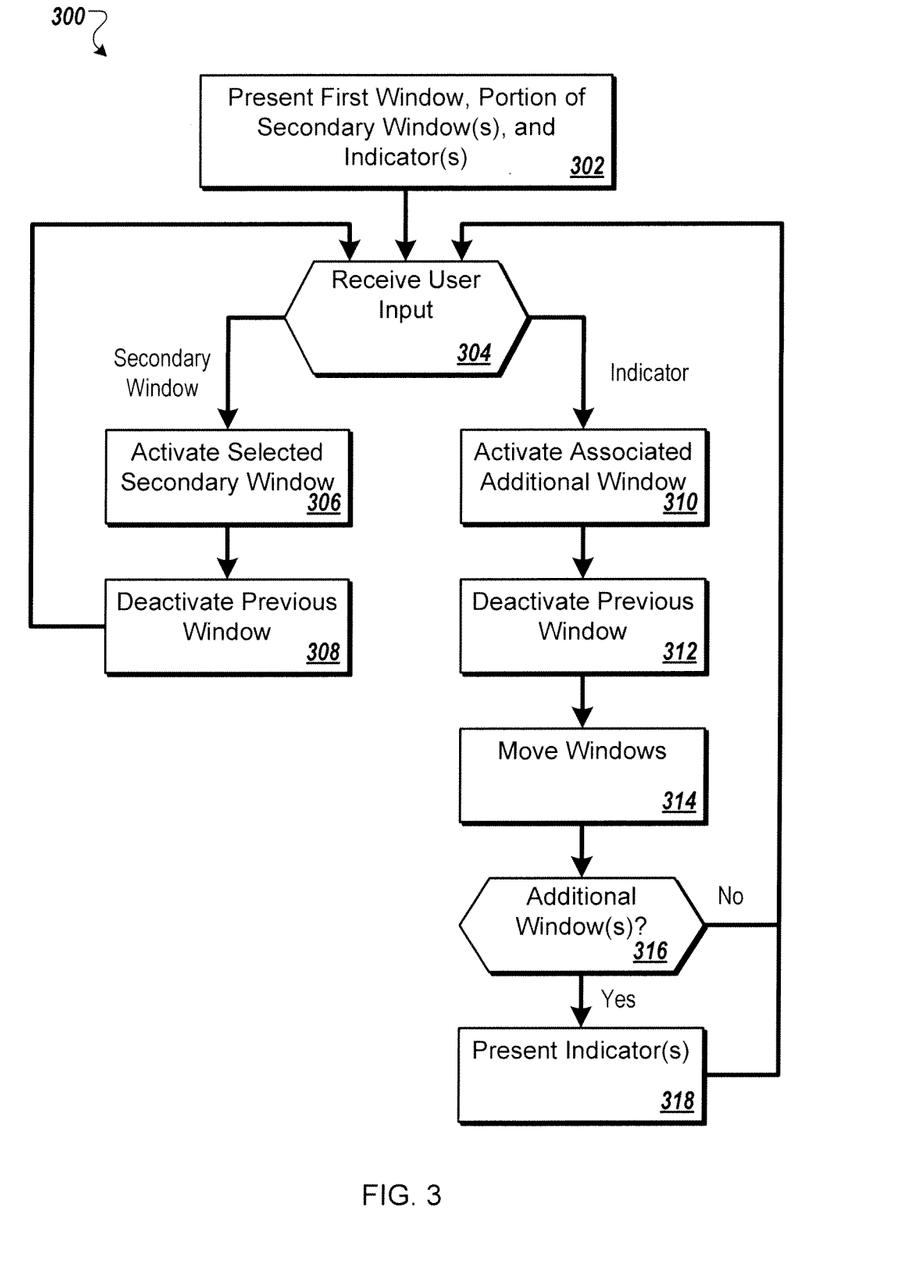
FIG. 3 is a flow chart that shows an example of a process for sliding based window management.

FIG. 3 is a flow chart that shows an example of a process 300 for sliding based window management. The process 300 may be performed, for example, by a system such as the system 100. For clarity of presentation, the description that follows uses the system 100 as an example for describing the process 300. However, another system, or combination of systems, may be used to perform the process 300.

The process 300 begins with presenting (302) a first window, at least a portion of each of one or more secondary windows, and one or more indicators in a graphical user interface. The first window is active and/or is in the foreground of the graphical user interface. The secondary windows are not active and/or are in the background of the graphical user interface. The indicators indicate that additional windows exist that may not be currently displayed. In some implementations, the indicators each include a small grayed out or blurred portion of an associated one of the additional windows. In some implementations, the GUI continuously updates content within the first window and the portions of the secondary windows and the small grayed out or blurred portions of the additional windows in the indicators are not continuously updated.

The process 300 receives (304) a user input that selects either one of the secondary windows or one of the indicators. For example, the tablet computing device 102b can receive a user input that selects the portion 108 of the secondary window 106b or the indicator 110 that is associated with the additional window 106c.

In response to receiving the user input that selects one of the secondary windows, the process 300 activates (306) the selected secondary window. For example, the tablet computing device 102b can bring the secondary window 106b to a foreground layer in front other windows in the viewing area 104 and/or make the secondary window 106b active within the viewing area 104. Being active refers to accepting user inputs or interactions within a window other than a user input that makes the window active.

Also in response to receiving the user input that selects one of the secondary windows, the process 300 deactivates (308) a previously active and/or foreground window (e.g., the first window). The process 300 performs the deactivation of the first window and activation of the secondary window without moving the first window and the secondary window across the graphical user interface. The lack of movement across the graphical user interface prevents any noticeable change in a horizontal and/or vertical position of the first window and the secondary window. For example, the tablet computing device 102b can send the first window 106a to a layer that is behind the secondary window 106b in the viewing area 104 and/or make the first window 106a inactive within the viewing area 104. The process 300 can then receive (304) further user inputs, such as the user input that selects one of the indicators.

In response to receiving the user input that selects one of the indicators, the process 300 activates (310) an additional window that is associated with the selected one of the indicators. For example, the tablet computing device 102b can bring the additional window 106c to a foreground layer in front other windows in the viewing area 104 and/or make the additional window 106c active within the viewing area 104.

Also in response to receiving the user input that selects one of the indicators, the process 300 deactivates (312) the first window and the secondary windows. For example, the tablet computing device 102b can send the first window 106a and the secondary window 106b to a layer that is behind the additional window 106c in the viewing area 104, and/or make the first window 106a and the secondary window 106b inactive within the viewing area 104.

The process 300 moves (314) the additional window across the graphical user interface so that the additional window is in view of the graphical user interface. The process 300 also moves (314) at least one of the first window and the secondary windows across the graphical user interface so that the at least one of the first window and the secondary windows is out of view of the graphical user interface. Out of view can include, in some implementations, displaying a small portion of an out of view window within one of the indicators. The small portion can be large enough to be selected with a pointing device, but small enough so as to be unobtrusive to the user and/or occupy a minimal amount of display space within the graphical user interface.

For example, the tablet computing device 102b can move the additional window 106c across the viewing area 104 so that the portion 112 is within the viewing area 104. The tablet computing device 102b also moves the first window 106a and the secondary window 106b across the viewing area 104 so that the first window 106a is out of the viewing area 104 (e.g., the portion 114 is outside the viewing area 104 and the remainder of the first window 106a is behind the secondary window 106b and the additional window 106c with the exception of a small portion that may be presented within the indicator 118.

If one or more additional windows exist that are out of view of the graphical user interface (316), then the process 300 presents (318) one or more indicators associated with the additional windows. For example, the tablet computing device 102b can present the indicator 110 associated with the additional window 106c and the indicator 118 associated with the first window 106a. The process 300 can then receive (304) further user inputs again that select secondary windows and/or indicators.

In some implementations, the windows are conceptually arranged in an ordered list or stack. Presenting indicators can include determining that one or more out of view windows exist in the list ahead of the currently presented windows, and presenting a corresponding indicator on a first side of the graphical user interface. Presenting indicators can further include determining that one or more out of view windows exist in the list after the currently presented windows, and presenting a corresponding indicator on a second side of the graphical user interface. If no indicators exist ahead of and/or after the currently presented windows, then the corresponding indicator is not presented.

In some implementations, the order of the operations in the process 300 can be performed in an order other than the order described here. For example, the steps of activating windows and deactivating windows can be performed at the same time, concurrently, or in either order. In another example, the steps of moving windows and activating/deactivating windows can also be performed at the same time, concurrently, or in either order.

Figure 4:
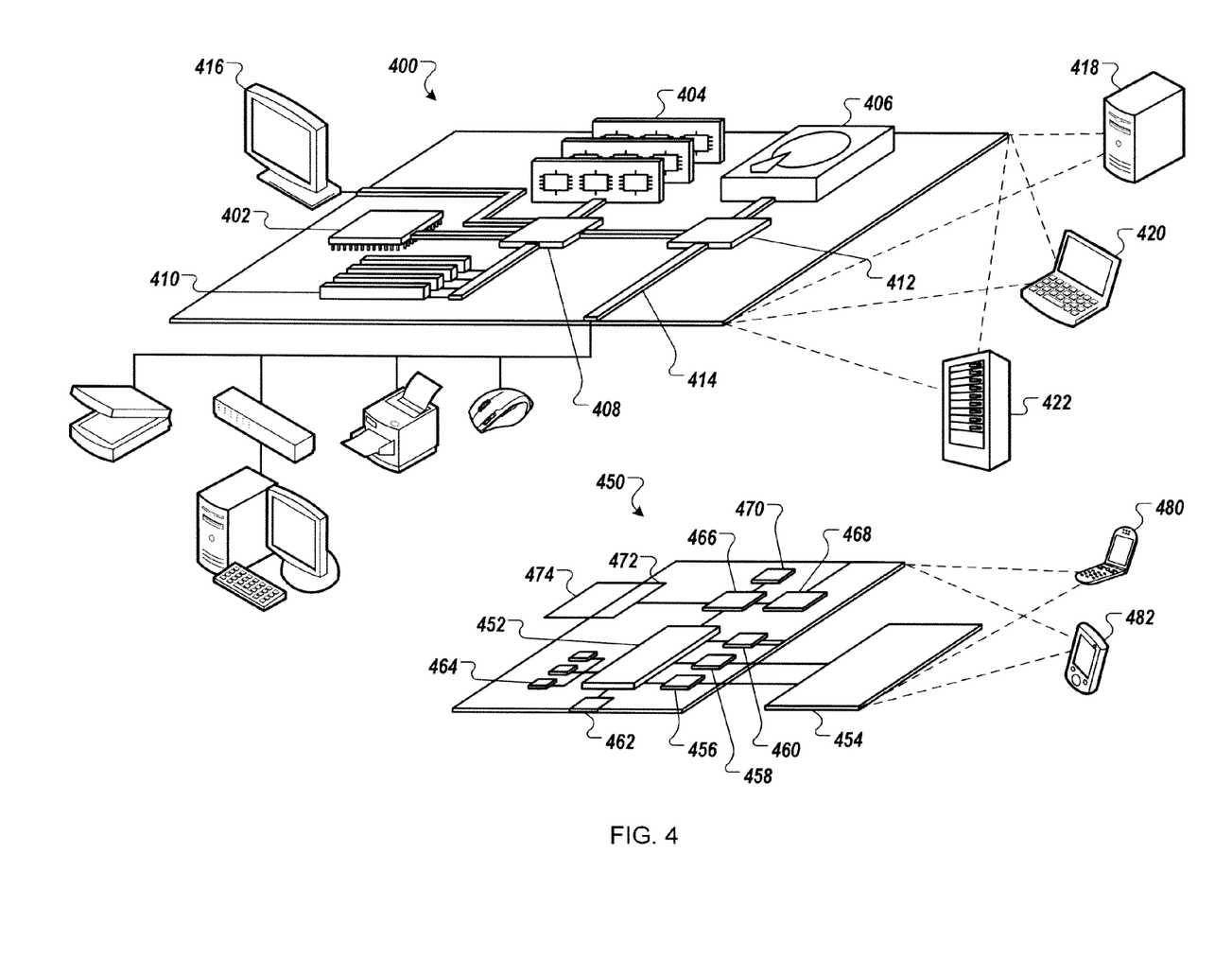
FIG. 4 is a schematic diagram that shows an example of a computing device and a mobile computing device.

FIG. 4 is a schematic diagram that shows an example of a computing device 400 and an example of a mobile computing device that can be used to implement the systems and techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 418, or multiple times in a group of such servers. In addition, it may be implemented in a personal computer such as a laptop computer 420. It may also be implemented as part of a rack server system 422. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. The memory 464 may include, for example, flash memory and/or NVRAM memory (non-volatile random access memory).

An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for window management, the method comprising:
   presenting a first window in a foreground of a graphical user interface;
   presenting at least a portion of each of one or more secondary windows in the graphical user interface;
   presenting one or more indicators in the graphical user interface indicating that additional windows exist, wherein each of the additional windows is not currently displayed within the graphical user interface, and wherein each of the one or more indicators is indicative of content of a corresponding one of the additional windows;
   receiving a first user selection of a first one of the indicators; and
   in response to receiving the first user selection of the first one of the indicators indicating that additional windows exist:
      presenting plural additional windows within the graphical user interface, wherein the plural additional windows were not displayed within the graphical user interface prior to the first user selection of the first one of the indicators,
      bringing at least one of the plural additional windows to the foreground in the graphical user interface,
      moving the at least one of the plural additional windows across the graphical user interface to be in view of the graphical user interface, wherein the at least one of the plural additional windows is repositioned on the graphical user interface,
      sending the first window and the secondary windows behind the at least one of the plural additional windows, and
      moving at least one of the first window and the secondary windows across the graphical user interface to be out of view of the graphical user interface, wherein the at least one of the first window and the secondary windows is repositioned on the graphical user interface.

2. The method of claim 1, further comprising:
   receiving a second user selection of one of the secondary windows; and
   in response to receiving the second user selection, bringing the selected one of the secondary windows to the foreground in the graphical user interface and sending the first window and others of the secondary windows behind the selected one of the secondary windows without moving the first window and the secondary windows across the graphical user interface.

3. The method of claim 2, wherein each of the indicators includes a grayed or blurred portion of an associated one of the additional windows.

4. The method of claim 2, wherein the first window and the at least one of the additional windows occupy less than a full width of the graphical user interface,
   wherein moving the additional window across the graphical user interface comprises moving the additional window horizontally across the graphical user interface, and
   wherein moving the at least one of the first window and the secondary windows across the graphical user interface comprises moving the at least one of the first window and the secondary windows horizontally across the graphical user interface.

5. The method of claim 4, wherein the first window, the secondary windows, and the additional windows are included in an ordered list of windows,
   wherein prior to receiving the first user selection, the first one of the indicators indicates that one or more of the additional windows exist before the first window and the secondary windows in the ordered list of windows, and wherein a second one of the indicators indicates that one or more of the additional windows exist after the first window and the secondary windows in the ordered list of windows.

6. The method of claim 5, further comprising determining, in response to the first user selection, that none of the additional windows exist before the at least one of the additional windows in the ordered list of windows, and no longer presenting the first one of the indicators in response to determining that none of the additional windows exist before the at least one of the additional windows.

7. The method of claim 6, wherein moving the at least one of the first window and the secondary windows across the graphical user interface comprises moving a last one of the secondary windows across the graphical user interface to be out of view of the graphical user interface, and wherein the method further comprises moving the first window and ones of the secondary windows other than the last one of the secondary windows across the graphical user interface with at least a portion of each remaining in view of the graphical user interface.

8. The method of claim 1, wherein each indicator comprises a representation of content of a corresponding additional window.

9. The method of claim 1, wherein moving the at least one of the additional windows across the graphical user interface to be in view of the graphical user interface comprises:

moving the at least one of the additional windows across the graphical user interface to be in view of the graphical user interface, wherein the at least one of the additional windows slides from side to side of the graphical user interface.

10. The method of claim 1, wherein moving the at least one of the first window and the secondary windows across the graphical user interface to be out of view of the graphical user interface comprises:

moving the at least one of the first window and the secondary windows across the graphical user interface to be out of view of the graphical user interface, wherein the at least one of the first window and the secondary windows slides from side to side of the graphical user interface.

11. The method of claim 1, wherein the first window, the one or more secondary windows, and the additional windows are arranged according to a stack, and wherein presenting the plural additional windows within the graphical user interface comprises shifting within the stack by a particular number of windows in a particular direction.

12. A non-transitory computer-readable medium storing instructions that when executed cause a computer to perform operations for window management, the operations comprising:

presenting a first window in a graphical user interface, wherein the first window is active;

presenting at least a portion of each of one or more secondary windows in the graphical user interface, wherein the secondary windows are not active;

presenting one or more indicators in the graphical user interface indicating that additional windows exist, wherein each of the additional windows is not currently displayed within the graphical user interface, and wherein each of the one or more indicators is indicative of content of a corresponding one of the additional windows;

receiving a first user selection of a first one of the indicators; and in response to receiving the first user selection of the first one of the indicators indicating that additional windows exist:

presenting plural additional windows within the graphical user interface, wherein the plural additional windows were not displayed within the graphical user interface prior to the first user selection of the first one of the indicators, making at least one of the plural additional windows active in the graphical user interface, moving the at least one of the plural additional windows across the graphical user interface to be in view of the graphical user interface, wherein the at least one of the plural additional windows is repositioned on the graphical user interface, making the first window and the secondary windows not active, and moving at least one of the first window and the secondary windows across the graphical user interface to be out of view of the graphical user interface, wherein the at least one of the first window and the secondary windows is repositioned on the graphical user interface.

13. The non-transitory computer-readable medium of claim 12, wherein the operations further comprise:

receiving a second user selection of one of the secondary windows; and in response to receiving the second user selection, making the selected one of the secondary windows active in the graphical user interface and making the first window and others of the secondary windows not active without moving the first window and the secondary windows across the graphical user interface.

14. The non-transitory computer-readable medium of claim 13, wherein each of the indicators includes a grayed or blurred portion of an associated one of the additional windows.

15. The non-transitory computer-readable medium of claim 13, wherein the first window and the at least one of the additional windows occupy less than a full width of the graphical user interface, wherein moving the additional window across the graphical user interface comprises moving the additional window horizontally across the graphical user interface, and wherein moving the at least one of the first window and the secondary windows across the graphical user interface comprises moving the at least one of the first window and the secondary windows horizontally across the graphical user interface.

16. The non-transitory computer-readable medium of claim 15, wherein the first window, the secondary windows, and the additional windows are included in an ordered list of windows, wherein prior to receiving the first user selection, the first one of the indicators indicates that one or more of the additional windows exist before the first window and the secondary windows in the ordered list of windows, and wherein a second one of the indicators indicates that one or more of the additional windows exist after the first window and the secondary windows in the ordered list of windows.

17. The non-transitory computer-readable medium of claim 16, wherein the operations further comprise determining, in response to the first user selection, that none of the additional windows exist before the at least one of the additional windows in the ordered list of windows, and no longer presenting the first one of the indicators in response to determining that none of the additional windows exist before the at least one of the additional windows.

18. The non-transitory computer-readable medium of claim 17, wherein moving the at least one of the first window and the secondary windows across the graphical user interface comprises moving a last one of the secondary windows across the graphical user interface to be out of view of the graphical user interface, and
wherein the operations further comprise moving the first window and ones of the secondary windows other than the last one of the secondary windows across the graphical user interface with at least a portion of each remaining in view of the graphical user interface.

19. A computer-implemented system for window management, the system comprising:
a display device that presents a graphical user interface that includes a first window, at least a portion of a second window, and one or more overflow indicators, wherein the first window is active and the second window is not active, and wherein the overflow indicators indicate that additional windows exist that are not currently presented, wherein each of the additional windows is not currently displayed within the graphical user interface, and wherein each of the one or more overflow indicators is indicative of content of a corresponding one of the additional windows;
an interface that receives a first user input that selects a first one of the overflow indicators; and
one or more processors that, in response to receiving the first user input that selects the first one of the overflow indicators:
present plural additional windows within the graphical user interface, wherein the plural additional windows were not displayed within the graphical user interface prior to the first user input that selects the first one of the overflow indicators,
make at least one of the plural additional windows active in the graphical user interface,
move the at least one of the plural additional windows across the graphical user interface to be in view of the graphical user interface, wherein the at least one of the plural additional windows is repositioned on the graphical user interface,
make the first window and the second window not active,
move the first window across the graphical user interface with at least a portion of the first window remaining in view of the graphical user interface, wherein the first window slides from side to side of the graphical user interface, and
move the second window across the graphical user interface to be out of view of the graphical user interface, wherein the second window is repositioned on the graphical user interface.

20. The system of claim 19, wherein the interface receives a second user input that selects the second window, and
wherein the processors, in response to receiving the second user input, make the second window active in the graphical user interface and make the first window not active without moving the first window and the second window across the graphical user interface.

21. The system of claim 20, wherein each of the overflow indicators includes a grayed or blurred portion of an associated one of the additional windows.

22. The system of claim 20, wherein the first window and the at least one of the additional windows occupy less than a full width of the graphical user interface, and
wherein the processors move the at least one of the additional windows, the first window, and the second window horizontally across the graphical user interface.

23. The system of claim 22, wherein the first window, the second window, and the additional windows are included in an ordered list of windows,
wherein prior to receiving the first user input, the first one of the overflow indicators indicates that one or more of the additional windows exist before the first window and the second window in the ordered list of windows, and
wherein a second one of the overflow indicators indicates that one or more of the additional windows exist after the first window and the second window in the ordered list of windows.

24. The system of claim 23, wherein the processors determine, in response to the first user input, that none of the additional windows exist before the at least one of the additional windows in the ordered list of windows, and no longer present the first one of the overflow indicators on the display device in response to determining that none of the additional windows exist before the at least one of the additional windows.

* * * * *